United States Patent
Shoemake

(10) Patent No.: US 12,480,714 B2
(45) Date of Patent: Nov. 25, 2025

(54) HEAT EXCHANGING CHANNEL FORMING AN INTERNAL CAVITY THAT STORES CRYOGENIC MATERIAL

(71) Applicant: PLUG POWER INC., Latham, NY (US)

(72) Inventor: Elijah Shoemake, Pullman, WA (US)

(73) Assignee: Plug Power Inc., Slingerlands, NY (US)

( * ) Notice: Subject to any disclaimer, the term of this patent is extended or adjusted under 35 U.S.C. 154(b) by 551 days.

(21) Appl. No.: 17/659,504

(22) Filed: Apr. 18, 2022

(65) Prior Publication Data
US 2022/0333867 A1    Oct. 20, 2022

Related U.S. Application Data

(60) Provisional application No. 63/201,207, filed on Apr. 18, 2021.

(51) Int. Cl.
F28D 1/06 (2006.01)
F17C 3/10 (2006.01)
F17C 13/00 (2006.01)

(52) U.S. Cl.
CPC ............. F28D 1/06 (2013.01); F17C 3/10 (2013.01); F17C 13/001 (2013.01);
(Continued)

(58) Field of Classification Search
CPC .... F17C 3/10; F17C 13/001; F17C 2201/032; F17C 2201/054; F17C 2201/056;
(Continued)

(56) References Cited

U.S. PATENT DOCUMENTS 4,928,496 A * 5/1990 Wallace ............... C01B 3/0068
165/104.12
6,638,348 B2 * 10/2003 Kuriiwa ............... C01B 3/0005
96/152

(Continued)

FOREIGN PATENT DOCUMENTS

JP      2006249197 A   9/2006
WO        0109557 A1   2/2001

OTHER PUBLICATIONS

International Search Report and Written Opinion dated Jul. 28, 2022, 10 pp.

*Primary Examiner* — Nelson J Nieves
(74) *Attorney, Agent, or Firm* — Heslin Rothenberg Farley and Mesiti P.C.; Victor A. Cardona, Esq.

(57) ABSTRACT

A heat exchanger comprises an inlet, an outlet, a heat exchanging channel, and an opening. The heat exchanging channel surrounds a cavity. The opening provides access to the cavity. The inlet is coupled to one end of the heat exchanging channel and the outlet is coupled to another end of the heat exchanging channel. The heat exchanging channel is isolated from the cavity. No access or passage is present between the heat exchanging channel and the cavity. During operation, heat exchanging fluid flows through the heat exchanging channel thereby cooling fluid within the cavity. The heat exchanging fluid never contacts the fluid within the cavity. In various embodiments, the heat exchanging channel has a single or stacked layer when viewed along a cross section. The heat exchanging channel has a spherical, cylindrical, or rectangular shape. In one embodiment, an insulative layer is disposed between layers of the heat exchanging channel.

13 Claims, 15 Drawing Sheets

CROSS SECTIONAL VIEW OF HEAT EXCHANGER WITH INSULATING LAYER AND FLUID CHANNEL (ANOTHER EMBODIMENT)

(52) U.S. Cl.
CPC ............... *F17C 2201/0157* (2013.01); *F17C 2201/032* (2013.01); *F17C 2201/054* (2013.01); *F17C 2201/056* (2013.01); *F17C 2201/058* (2013.01); *F17C 2203/0325* (2013.01); *F17C 2203/0329* (2013.01); *F17C 2203/0333* (2013.01); *F17C 2203/0379* (2013.01); *F17C 2203/0387* (2013.01); *F17C 2203/0631* (2013.01); *F17C 2209/21* (2013.01); *F17C 2221/012* (2013.01); *F17C 2223/0161* (2013.01); *F17C 2223/033* (2013.01); *F17C 2227/0341* (2013.01); *F17C 2227/0381* (2013.01); *F17C 2260/033* (2013.01); *F17C 2270/0194* (2013.01); *F28F 2255/00* (2013.01)

(58) Field of Classification Search
CPC ........ F17C 2201/058; F17C 2201/0325; F17C 2203/0325; F17C 2203/0329; F17C 2203/03; F17C 2203/33; F17C 2203/035; F17C 2203/0379; F17C 2203/0387; F17C 2203/0631; F17C 2209/21; F17C 2221/011; F17C 2221/012; F17C 2221/014; F17C 2221/033; F17C 2223/033; F17C 2223/0123; F17C 2223/0161; B64D 37/16; B64D 37/30
See application file for complete search history.

(56) References Cited

U.S. PATENT DOCUMENTS

| | | | |
|---|---|---|---|
| 2011/0094897 A1* | 4/2011 | Chiang | F17C 3/10 222/146.2 |
| 2011/0192732 A1* | 8/2011 | Lin | F17C 11/005 206/0.6 |
| 2016/0033083 A1* | 2/2016 | Leachman | F17C 3/04 220/560.14 |
| 2018/0106427 A1* | 4/2018 | Leachman | F17C 3/04 |
| 2020/0208777 A1* | 7/2020 | He | F17C 1/12 |

* cited by examiner

PERSPECTIVE VIEW OF HEAT EXCHANGER

TOP-DOWN CROSS SECTIONAL VIEW
OF HEAT EXCHANGER

CROSS SECTIONAL VIEW OF HEAT EXCHANGER

CROSS SECTIONAL VIEW OF HEAT EXCHANGER WITH INSULATING LAYER (ANOTHER EMBODIMENT)

CROSS SECTIONAL VIEW OF HEAT EXCHANGER
WITH INSULATING LAYER AND FLUID CHANNEL
(ANOTHER EMBODIMENT)

CROSS SECTIONAL VIEW OF HEAT EXCHANGER

CROSS SECTIONAL VIEW OF HEAT EXCHANGER

TOP VIEW OF HEAT EXCHANGER
(ANOTHER EMBODIMENT)

CROSS-SECTIONAL PERSPECTIVE VIEW
OF HEAT EXCHANGER

CROSS SECTIONAL VIEW OF HEAT EXCHANGER

BACK VIEW OF HEAT EXCHANGER

CROSS SECTIONAL EXPLODED PERSPECTIVE VIEW OF HEAT EXCHANGER

CROSS SECTIONAL EXPLODED PERSPECTIVE
VIEW OF HEAT EXCHANGER

CROSS SECTIONAL PERSPECTIVE VIEWS
OF HEAT EXCHANGER

HEAT EXCHANGING CHANNEL FORMING AN INTERNAL CAVITY THAT STORES CRYOGENIC MATERIAL

CROSS REFERENCE TO RELATED APPLICATIONS

This application claims priority benefit under Section 35 U.S.C. § 119(e) of U.S. Provisional Application No. 63/201,207 filed Apr. 18, 2021, entitled, "Heat Exchanging Channel Forming an Internal Cavity That Stores Cryogenic Material", which is incorporated herein by reference in its entirety.

TECHNICAL FIELD

The present invention relates generally to liquid storage, and more particularly to cryogenic fluid storage.

BACKGROUND INFORMATION

Hydrogen is a common cryogenic fluid used in various applications such as aerospace applications.

SUMMARY

A novel lightweight, heat exchanger comprises a heat exchanging channel that provides broad area cooling of an internal cavity. The novel heat exchanger encapsulates a cryogenic fluid (e.g., propellant) enabling zero boil-off or liquefaction of in situ resources. Broad area cooling of cryogenic fluids will significantly expand the capabilities of cryogenic storage for a wide variety of applications. The flexibility of a heat exchanger designed for broad area cooling and fluid storage allows for engineered parasitic heat loads into the propellant making it customizable for short-term and long-term cryogenic fuel storage to support future space missions. Pairing the novel heat exchanger in tandem with a cryogenic refrigeration cycle would also enable zero boil-off tanks or the onsite liquefaction of cryogens, critical for future development of liquid hydrogen vehicles and In Situ Resource Utilization on remote planetary bodies. The number of fluid passageways, insulation layer thickness, and coolant properties can be engineered to control the parasitic heat leak into the tank resulting in low or zero boil-off. The proposed tank technology has the potential to revolutionize liquid hydrogen as a zero-emission fuel for long range electric aircrafts and large marine vessels due to its high specific energy. This technology allows for tunable boil-off rates which simplifies operations and logistics making liquid hydrogen financially feasible for the aerospace and maritime sectors in the near future. In addition, this novel technology can be readily used for in situ liquefaction if the inlet coolant properties enable net cooling.

In one embodiment, a heat exchanger comprises an inlet, an outlet, a heat exchanging channel, and an opening. The heat exchanging channel surrounds a cavity. The opening provides access to the cavity and the opening is the only access to the cavity. The heat exchanger stores and cools liquid in the cavity. By separating the heat exchanging channel from fluid within the cavity, fluid in the cavity can be stored indefinitely without undesirable boiling off of the fluid. The heat exchanging channel forms and surrounds the cavity such that no refrigeration system is needed inside the cavity. In one example, fluid stored in the cavity is liquid hydrogen or liquid cryogen.

The inlet is coupled to one end of the heat exchanging channel and the outlet is coupled to another end of the heat exchanging channel. The heat exchanging channel is isolated from the cavity. No access or passage is present between the heat exchanging channel and the cavity. During operation, heat exchanging fluid flows through the heat exchanging channel thereby cooling fluid within the cavity. The heat exchanging fluid never contacts the fluid within the cavity. In various embodiments, the heat exchanging channel has a single or stacked layer when viewed along a cross section. The heat exchanging channel has a spherical, cylindrical, or rectangular shape. In one embodiment, an insulative layer is disposed between layers of the heat exchanging channel.

The novel heat exchanger provides significant advantages in manufacture. Various embodiments of the novel heat exchanger are manufactured having custom shapes and layers. These custom shapes and layers can be employed to satisfy various size limitations, volume requirements, and optimization for various liquids. For example, such novel manufacturing techniques of the heat exchanger eliminate the need for internal refrigeration within the cavity. Importantly, the custom shapes and layers provide more control over the surface area of the heat exchanging channel and volume of the cavity. For example, increasing the length of the heat exchanging channel may result in the increase the time for heat exchanging fluid to travel through the heat exchanging channel without increasing the volume of the cavity.

The novel heat exchanger provides significant advantages in maintenance and operations. Separating heat exchanging fluid from stored fluid in the cavity provides more robust control of fluid flow and cooling dynamics. By isolating the heat exchanging fluid from the stored fluid in the cavity, less maintenance is involved because removal of the stored fluid is minimized. In addition, this separation allows for separate controls and independent controls. In the event that either heat exchanging fluid or stored fluid in the cavity is contaminated, flushing of the non-contaminated fluid is avoided.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings. In the description and claims, terms such as top", bottom", front", back", and side" are used to describe relative directions and orientations, and it is to be understood that the overall structure being described can actually be oriented in any way in three-dimensional space.

Figure 1:
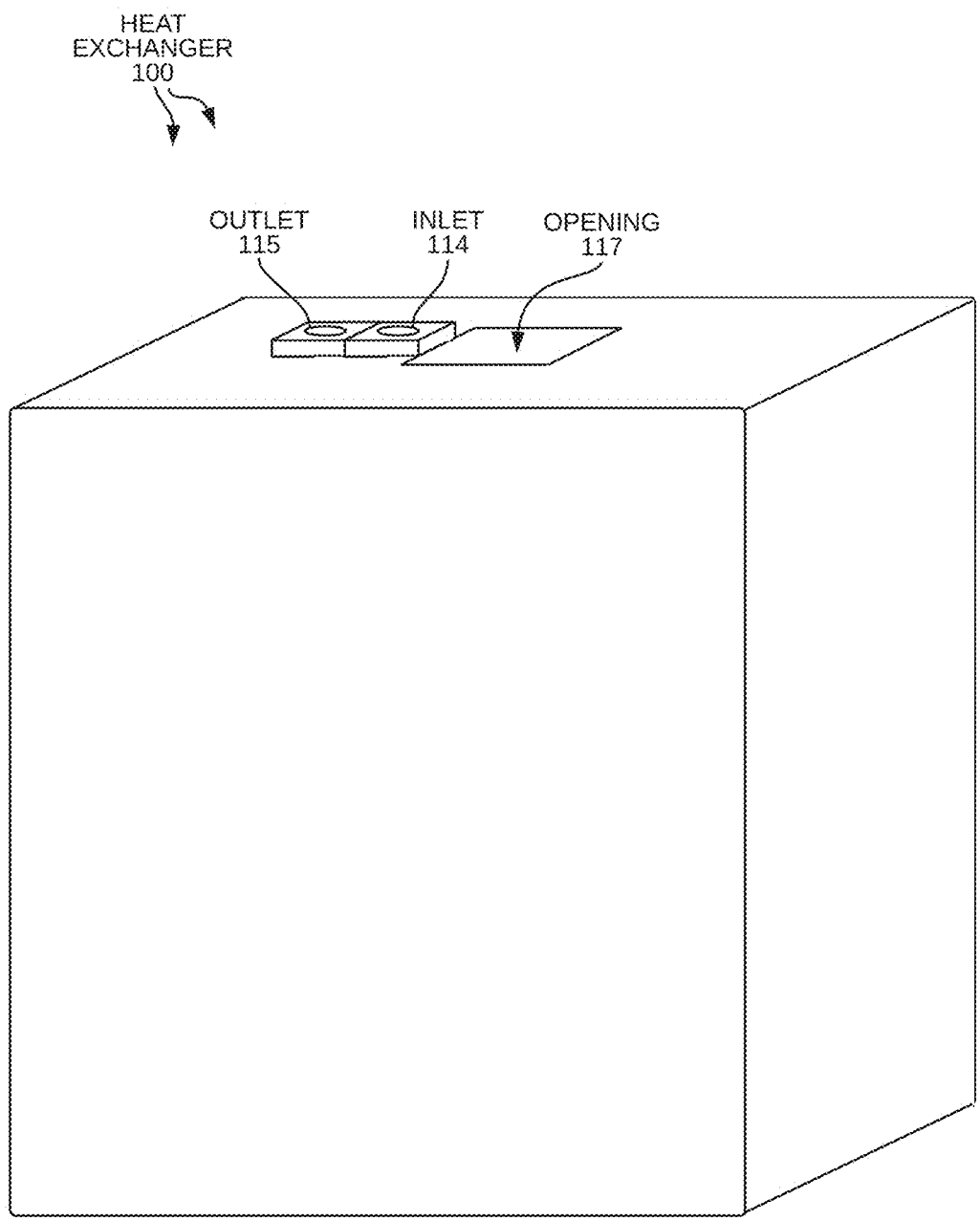
FIG. 1 is a diagram of a perspective view of a novel heat exchanger 100.
Figure 2:
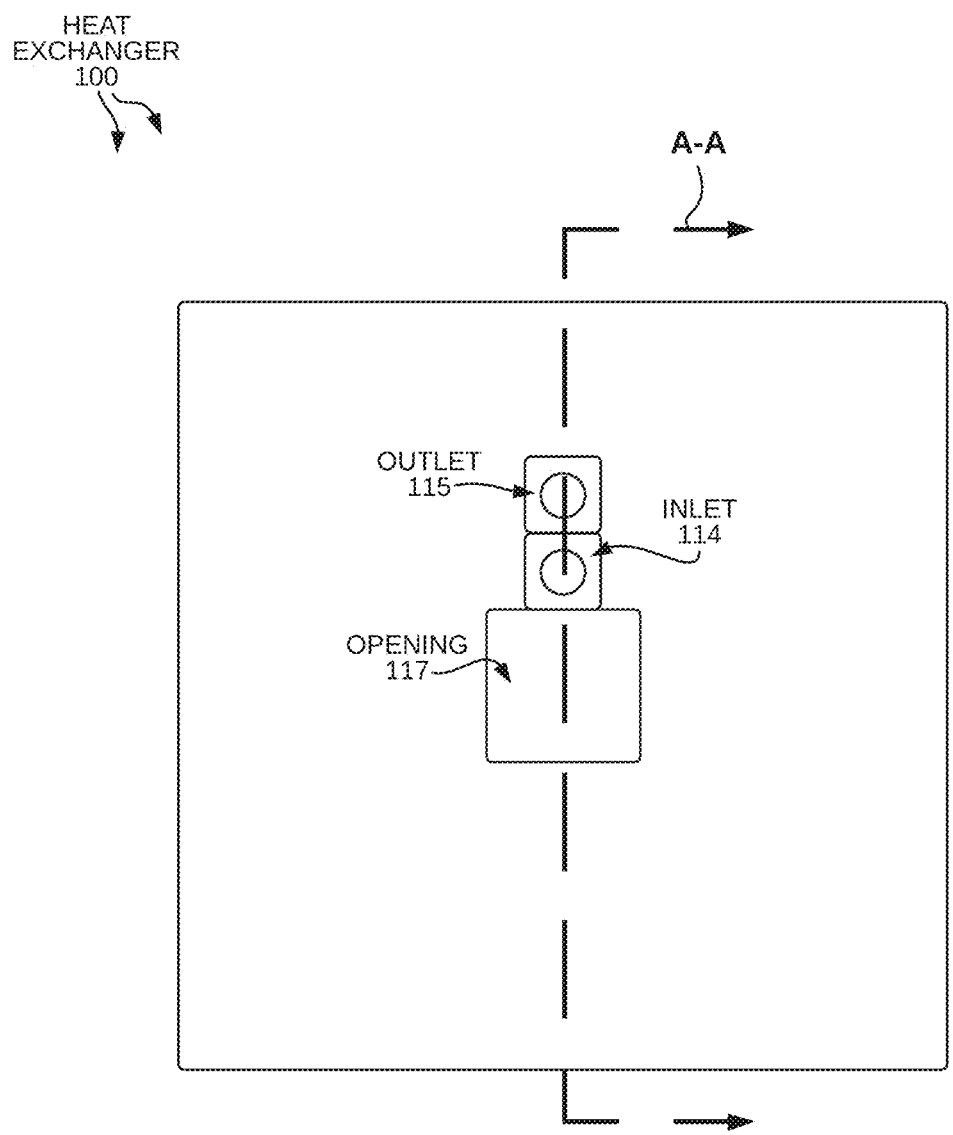
FIG. 2 is a diagram of a top-down view of the heat exchanger 100.

FIG. 1 is a diagram of a perspective view of a novel heat exchanger 100. In this embodiment, heat exchanger 100 has a shape substantially similar to a rectangular prism with curved corners. In another embodiment, heat exchanger 100 has a different shape (e.g., cylindrical). FIG. 2 is a diagram of a top-down view of the heat exchanger 100. Accordingly, from a top-down perspective, the heat exchanger 100 has a square shape with rounded corners. FIG. 2 illustrates an exemplary cross section (A-A) of heat exchanger 100. In this example, the cross section (A-A) is shaped similar to a rectangle with curved corners (see FIG. 3). Heat exchanger 100 will be further described in the detailed description of FIG. 3 below.

Figure 3:
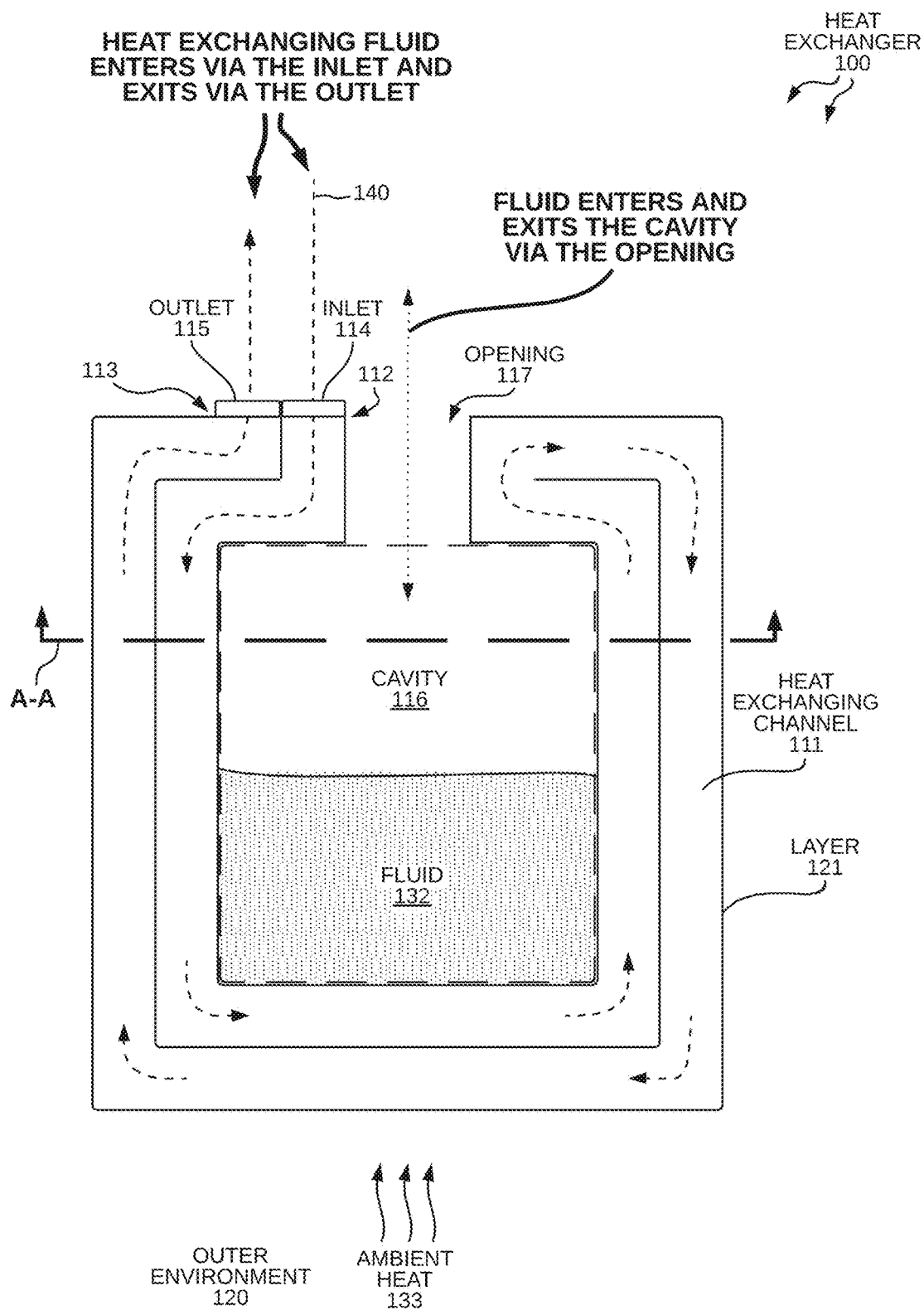
FIG. 3 is a diagram of a view of an exemplary cross section of heat exchanger 100.

FIG. 3 is a diagram of a view of an exemplary cross section of heat exchanger 100. For example, the cross section view is taken at cross-section indicator A-A as shown in FIG. 2.

Heat exchanger 100 comprises a heat exchanging channel 111, an inlet 114, an outlet 115, a cavity 116, and an opening 117. The heat exchanging channel 111 extends from a first end 112 to a second end 113. The heat exchanging channel 111 surrounds the cavity 116. The opening 117 provides access to the cavity 116. For example, fluid 132 (e.g., liquid hydrogen) is added to the heat exchanger 100 via the opening 117 and stored in the cavity 116. In another example, fluid 132 is removed from the cavity 116 of heat exchanger 100 via the opening 117. The inlet 114 is coupled to the first end 112 of the heat exchanging channel 111 and the outlet 115 is coupled to the second end 113 of the heat exchanging channel 111. During an exemplary operation, heat exchanging fluid 140 fluid flows freely throughout the heat exchanging channel 111 input via the inlet 114 and output via the outlet 115.

The heat exchanging channel 111 comprises a single layer 121 that is disposed along cavity 116, opening 117, and an outermost exterior of the heat exchanger 100. In other embodiments, the heat exchanging channel 111 is a stacked configuration including multiple layers. For example, in one embodiment the heat exchanging channel 111 includes at least one insulating layer. In yet another embodiment, heat exchanger 100 includes a fluid channel disposed between portions of the heat exchanging channel 111 which may be used to add or remove fluid from the cavity 116 without contacting any heat exchanging fluid.

In accordance with at least one novel aspect, the heat exchanging channel 111 is isolated from the cavity 116 such that fluid 132 in the cavity 116 and heat exchanging fluid 140 in the heat exchanging channel 111 thermally interact but do not contact each other. No access is provided between the heat exchanging channel 111 and the cavity 116. For example, cryogenic fluid in the cavity 116 does not contact heat exchanging fluid in the heat exchanging channel 111. No access is provided between the inlet 114 and the cavity 116. No access is provided between the outlet 115 and the cavity 116. No access is provided between the opening 117 and the heat exchanging channel 111.

During an exemplary operation, heat exchanging fluid 140 enters the first end 112 of the heat exchanging channel 111 at a temperature less than or equal to the temperature of the heat exchanging channel 111. The heat exchanging fluid 140 absorbs heat while flowing through the heat exchanging channel 111. Accordingly, heat exchanging fluid 140 exits via the second end 113 at a temperature greater than or equal to the temperature when entering the first end 112. For example, heat is transferred from fluid 132 contained in the cavity 116 through layer 121, as the heat exchanging fluid 140 flows through the heat exchanging channel 111. Furthermore, at least some of the heat exchanging fluid 140 flowing through the heat exchanging channel 111 thermally interacts with ambient heat 133 emitted from the outer environment 120 thereby reducing the amount of heat that leaks" into the cavity 116.

Heat exchanging channel 111 can be configured to receive fluids 132 and 140 based on storage needs. For example, increasing the length of the heat exchanging channel 111 may increase the amount of time it takes heat exchanging fluid 140 to travel from the first end 112 to the second end 113 without increasing the volume of cavity 116. In another example, heat exchanging channel 111 decreasing may decrease the surface area of cavity 116.

The heat exchanging fluid 140 assists in maintaining the temperature of the cavity 116. This allows for control of the state of matter of the fluid 132 that is stored within the cavity 116. In one example, the fluid 132 stored within the interior cavity 116 is liquid hydrogen ($H_2$). In other examples, the fluid 132 is liquid oxygen, liquid methane, or liquid natural gas. The heat exchanging fluid 140 is supplied into heat exchanger 100 is a refrigerant such as Helium, Hydrogen, Neon, or Nitrogen. By separating the heat exchanging channel 111 and the cavity 116, the heat exchanger 100 provides more combinations of fluid 132 and heat exchanging fluid 140. Fluid 132 does not mix with the heat exchanging fluid 140 thereby reducing dilution of fluid 132 product being removed from the cavity 116. By not mixing the fluid 132 and the heat exchanging fluid 140 heat exchanger 100 eliminates the need for an additional separation process.

The layer 121 which forms heat exchanging channel 111 is made of material comprising one of the following composite reinforced plastics, polymers, metals, and/or ceramics. In one example, the heat exchanging channel 111 is fabricated as a single unit or portions via an additive manufacturing process, metal printing process, or forging process. In another example, the heat exchanging channel 111 is formed as a single unit or portions without a welding, extruding, casting, stamping, or forging process.

The heat exchanging channel 111 is shaped without compromising structural integrity or reducing thermal insulating capability. Additionally, cavity 116 is formed by shaping the heat exchanging channel 111. Importantly, the novel heat exchanger does not require a separate distinct structure for storing liquid because the layer 121 of heat exchanging channel 111 simultaneously forms cavity 116 while providing the overall shape for the heat exchanger 100.

Figure 4:
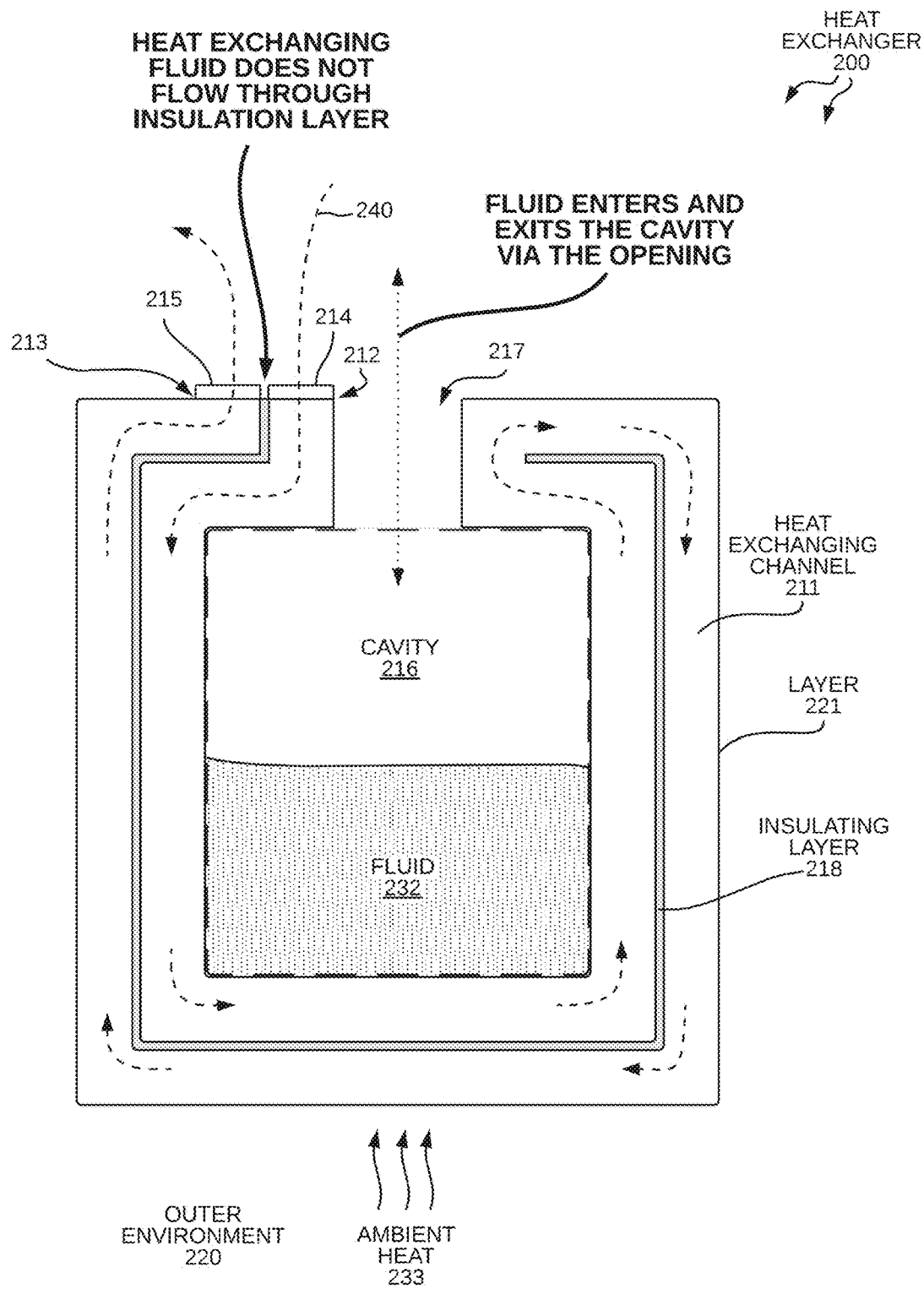
FIG. 4 is a diagram of a view of an exemplary cross section of a heat exchanger 200 in accordance with another embodiment.

FIG. 4 is a diagram of a view of an exemplary cross section of a heat exchanger 200 in accordance with another embodiment. Heat exchanger 200 comprises a heat exchanging channel 211, an inlet 214, an outlet 215, a cavity 216, and an opening 217. The heat exchanging channel 211 extends from a first end 212 to a second end 213. The heat exchanging channel 211 surrounds the cavity 216. The opening 217 provides access to the cavity 216. For example, fluid 232 (e.g., liquid hydrogen) is added to the heat exchanger 200 via the opening 217 and stored in the cavity 216. In another example, fluid 232 is removed from the cavity 216 of heat exchanger 200 via the opening 216. The inlet 214 is coupled to the first end 212 of the heat exchanging channel 211 and the outlet 215 is coupled to the second end 213 of the heat exchanging channel 211. During an exemplary operation, heat exchanging fluid 240 fluid flows freely throughout the heat exchanging channel 211 input via the inlet 214 and output via the outlet 215.

The heat exchanging channel 211 comprises a layer 221 that is disposed along the cavity 216, the opening 217, an outermost exterior of the heat exchanger 200. An insulating layer 228 is disposed along layer 221. In the example shown in FIG. 4, the insulating layer 228 is disposed between portions of heat exchanger channel 211. The insulating layer 228 employs any suitable insulating topology to insulate portions of the heat exchanging channel 211 and may include material. For example, materials such as aerogels, rigid foam (e.g., polyisocyanurate, polyurethane), and/or cellular glass can be used to insulate portions of the heat exchanging channel 221. Insulating layer 228 reduces the amount of thermal interaction between the fluid 232 contained in the cavity 216 and outer environment 220.

There is no interface provided between the insulating layer 228 and the heat exchanging channel 211. No heat exchanging fluid is flowable through the insulating layer 228. No access is provided between the insulating layer 228 and the cavity 216. No access is provided between the inlet 214 and the insulating layer 228. No access is provided between the outlet 215 and the insulating layer 228. No access is provided between the opening 217 and the insulating layer 228.

In another embodiment, the heat exchanging channel 211 does not include any insulating layer. For example, insulating material may be disposed between layer 221 to provide insulation for portions of the heat exchanging channel 211. In yet another embodiment, heat exchanger 200 includes at least two insulating layers in between various portions of the heat exchanger channel 211.

In other embodiments, the heat exchanging channel 211 is a stacked configuration including multiple layers. In yet another embodiment, heat exchanger 200 includes a fluid channel disposed between portions of the heat exchanging channel 511 which may be used to add or remove fluid from the cavity 216 without contacting any heat exchanging fluid.

In accordance with at least one novel aspect, the heat exchanging channel 211 is isolated from the cavity 216 such that fluid 232 in the cavity 216 and heat exchanging fluid 240 in the heat exchanging channel 211 thermally interact but do not contact each other. No access is provided between the heat exchanging channel 211 and the cavity 216. For example, cryogenic fluid in the cavity 216 does not contact heat exchanging fluid in the heat exchanging channel 211. No access is provided between the inlet 214 and the cavity 216. No access is provided between the outlet 215 and the cavity 216. No access is provided between the opening 217 and the heat exchanging channel 211.

During an exemplary operation, heat exchanging fluid 240 enters the first end 212 of the heat exchanging channel 211 at a temperature less than or equal to the temperature of the heat exchanging channel 211. The heat exchanging fluid 240 absorbs heat while flowing through the heat exchanging channel 211. Accordingly, heat exchanging fluid 240 exits via the second end 213 at a temperature greater than or equal to the temperature when entering the first end 212. For example, heat is transferred from fluid 232 contained in the cavity 216 through layer 221, as the heat exchanging fluid 240 flows through the heat exchanging channel 211. Furthermore, at least some of the heat exchanging fluid 240 flowing through the heat exchanging channel 211 thermally interacts with ambient heat 233 emitted from the outer environment 220 thereby reducing the amount of heat that leaks" into the cavity 216.

Heat exchanging channel 211 can be configured to receive fluids 232 and 240 based on storage needs. For example, increasing the length of the heat exchanging channel 211 may increase the amount of time it takes heat exchanging fluid 240 to travel from the first end 212 to the second end 213 without increasing the volume of cavity 216. In another example, heat exchanging channel 111 decreasing may decrease the surface area of cavity 116.

The heat exchanging fluid 240 assists in maintaining the temperature of the cavity 216. This allows for control of the state of matter of the fluid 232 that is stored within the cavity 216. In one example, the fluid 232 stored within the interior cavity 216 is liquid hydrogen ($H_2$). In other examples, the fluid 232 is liquid oxygen, liquid methane, or liquid natural gas. The heat exchanging fluid 240 is supplied into heat exchanger 200 is a refrigerant such as Helium, Hydrogen, Neon, or Nitrogen. By separating the heat exchanging channel 211 and the cavity 216, the heat exchanger 200 provides more combinations of storage of cryogenic fluids and heat exchanging fluids with different states of matter. Fluid 232 does not mix with the heat exchanging fluid 240 thereby reducing dilution of fluid 232 product being removed from the cavity 216. By not mixing the fluid 232 and the heat exchanging fluid 240 heat exchanger 200 eliminates the need for an additional separation process.

The layer 221 which forms heat exchanging channel 211 is made of material comprising one of the following composite reinforced plastics, polymers, metals, and/or ceramics. In one example, the heat exchanging channel 211 is fabricated as a single unit or portions via an additive manufacturing process, metal printing process, or forging process. In another example, the heat exchanging channel 211 is formed as a single unit or portions without a welding, extruding, casting, stamping, or forging process.

The heat exchanging channel 211 is shaped without compromising structural integrity or reducing thermal insulating capability. Additionally, cavity 216 is formed by shaping the heat exchanging channel 211. Importantly, the novel heat exchanger does not require a separate distinct structure for storing liquid because the layer 221 of heat exchanging channel 211 simultaneously forms cavity 216 while providing the overall shape for the heat exchanger 200.

Figure 5:
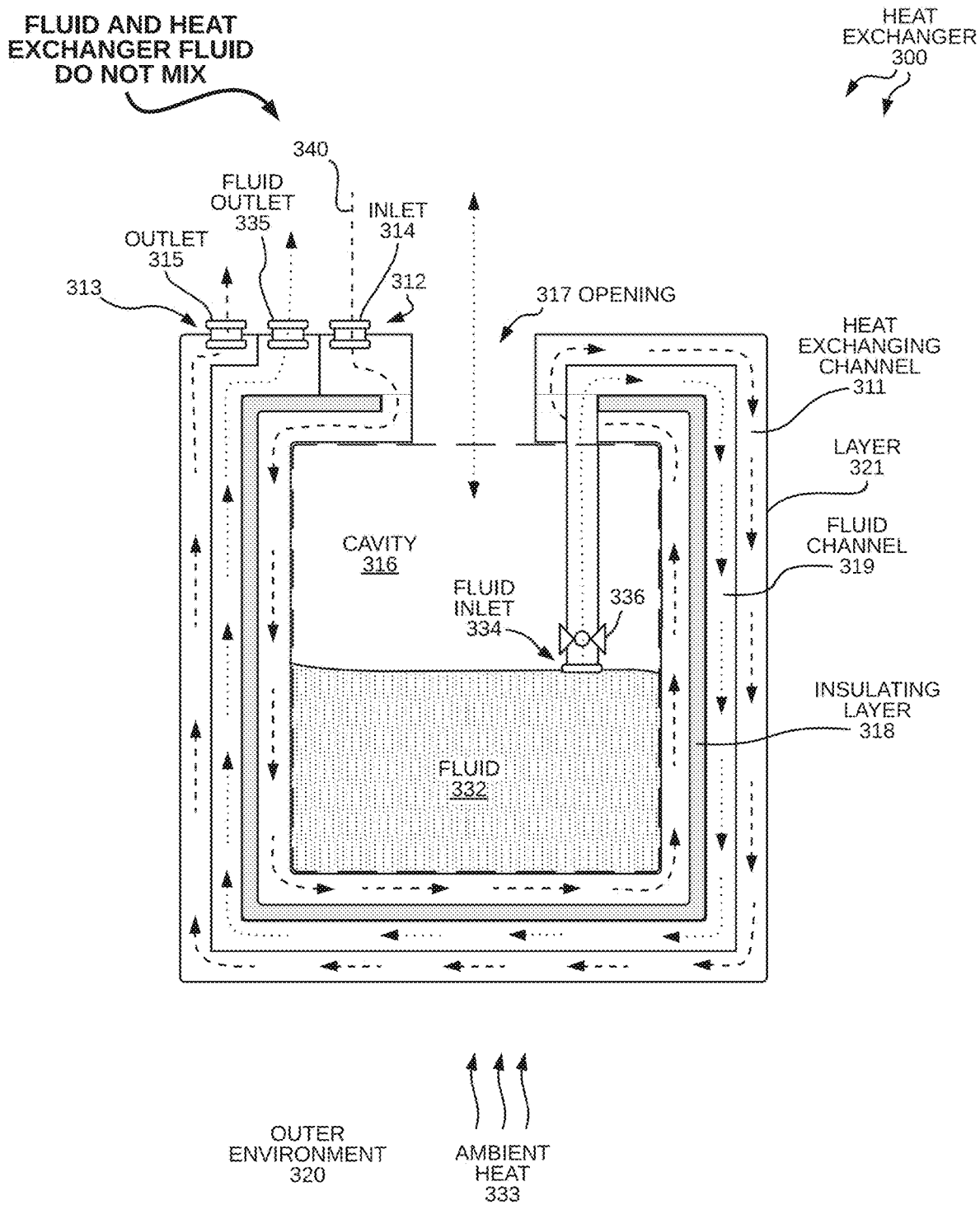
FIG. 5 is a diagram of a view of an exemplary cross section of a heat exchanger 300 in accordance with another embodiment.

FIG. 5 is a diagram of a view of an exemplary cross section of a heat exchanger 300 in accordance with another embodiment. Heat exchanger 300 comprises a heat exchanging channel 311, an inlet 314, an outlet 315, a cavity 316, an opening 317, and a fluid channel 319.

The heat exchanging channel 311 extends from a first end 312 to a second end 313. The inlet 314 is coupled to the first end 312 of the heat exchanging channel 311 and the outlet 315 is coupled to the second end 313 of the heat exchanging channel 311. The heat exchanging channel 311 surrounds the cavity 316. The opening 317 provides access to the cavity 316. For example, fluid 332 (e.g., liquid hydrogen) is added to the heat exchanger 300 via the opening 317 and stored in the cavity 316. In another example, fluid 332 is removed from the cavity 316 of heat exchanger 300 via the opening 317.

In the example shown in FIG. 5, fluid 332 may also be removed from the cavity 316 via the fluid channel 319. The fluid channel 319 comprises a fluid inlet 334 and a fluid outlet 335. The fluid channel 319 extends from the fluid inlet 334 to the fluid outlet 335. A portion of the fluid channel 319 is disposed along the heat exchanging channel 311. Fluid channel 319 is coupled to the cavity 116 via the fluid inlet 334. The length of the portion of the fluid channel 319 disposed within the cavity 316 is determined based on the amount of fluid 332 stored within the cavity 316 such that the fluid 332 contacts the fluid inlet 334. In the example shown in FIG. 5 the fluid channel 319 includes a valve 336 that is used to control the flowrate of fluid 332 being removed from the cavity 316.

No heat exchanging fluid is flowable through the fluid channel 319. No access is provided between the inlet 314 and the fluid channel 319. No access is provided between the outlet 315 and the fluid channel 319. No access is provided between the fluid inlet 334 and the heat exchanging channel 311. No access is provided between the fluid outlet 335 and the heat exchanging channel 311.

The heat exchanging channel 311 comprises a layer 321 that is disposed along the cavity 316, the opening 317, an outermost exterior of the heat exchanger 300, the fluid channel 319, and an insulating layer 328. The insulating layer 328 is disposed along layer 321. In the example shown in FIG. 5, the insulating layer 328 is disposed between portions of heat exchanger channel 311 and the fluid channel 319. The insulating layer 328 employs any suitable insulating topology to insulate portions of the heat exchanging channel 311 and may include material. For example, materials such as aerogels, rigid foam (e.g., polyisocyanurate, polyurethane), and/or cellular glass can be used to insulate portions of the heat exchanging channel 321. Insulating layer 328 reduces the amount of thermal interaction between the fluid 332 contained in the cavity 316 and outer environment 320.

There is no interface provided between the insulating layer 328 and the heat exchanging channel 311 or the fluid channel 319. No heat exchanging fluid is flowable through the insulating layer 328. No access is provided between the insulating layer 328 and the cavity 316. No access is provided between the inlet 314 or the fluid inlet 334 and the insulating layer 328. No access is provided between the outlet 315 or the fluid outlet 335 and the insulating layer 328. No access is provided between the opening 317 and the insulating layer 328.

In another embodiment, the heat exchanging channel 311 does not include any insulating layer. For example, insulating material may be disposed between layer 321 to provide insulation for portions of the heat exchanging channel 311. In yet another embodiment, heat exchanger 300 includes at least two insulating layers in between various portions of the heat exchanger channel 311. In yet another embodiment, heat exchanger 300 includes does not include fluid channel 319. In other embodiments, the heat exchanging channel 311 is a stacked configuration including multiple layers.

In accordance with at least one novel aspect, the heat exchanging channel 311 is isolated from the cavity 316 such that fluid 332 in the cavity 316 and heat exchanging fluid 340 in the heat exchanging channel 311 thermally interact but do not contact each other. No access is provided between the heat exchanging channel 311 and the cavity 316. For example, cryogenic fluid in the cavity 316 does not contact heat exchanging fluid in the heat exchanging channel 311. No access is provided between the inlet 314 and the cavity 316. No access is provided between the outlet 315 and the cavity 316. No access is provided between the opening 317 and the heat exchanging channel 311.

During an exemplary operation, heat exchanging fluid 340 enters the first end 312 of the heat exchanging channel 311 at a temperature less than or equal to the temperature of the heat exchanging channel 311. The heat exchanging fluid 340 absorbs heat while flowing through the heat exchanging channel 311. Accordingly, heat exchanging fluid 340 exits via the second end 313 at a temperature greater than or equal to the temperature when entering the first end 312. For example, heat is transferred from fluid 332 contained in the cavity 316 through layer 321, as the heat exchanging fluid 340 flows through the heat exchanging channel 311. Furthermore, at least some of the heat exchanging fluid 340 flowing through the heat exchanging channel 311 thermally interacts with ambient heat 333 emitted from the outer environment 320 thereby reducing the amount of heat that leaks" into the cavity 316.

Heat exchanging channel 311 can be configured to receive fluids 332 and 340 based on storage needs. For example, increasing the length of the heat exchanging channel 311 may increase the amount of time it takes heat exchanging fluid 340 to travel from the first end 312 to the second end 313 without increasing the volume of cavity 316. In another example, heat exchanging channel 311 decreasing may decrease the surface area of cavity 316. In yet another example, increasing the length of the fluid channel 319 may not increase the volume of cavity 316.

The heat exchanging fluid 340 assists in maintaining the temperature of the cavity 316. This allows for control of the state of matter of the fluid 332 that is stored within the cavity 316. In one example, the fluid 332 stored within the interior cavity 316 is liquid hydrogen ($H_2$). In other examples, the fluid 332 is liquid oxygen, liquid methane, or liquid natural gas. The heat exchanging fluid 340 is supplied into heat exchanger 300 is a refrigerant such as Helium, Hydrogen, Neon, or Nitrogen. By separating the heat exchanging channel 311 and the cavity 316, the heat exchanger 300 provides more combinations of storage of cryogenic fluids and heat exchanging fluids with different states of matter. Fluid 332 does not mix with the heat exchanging fluid 340 thereby reducing dilution of fluid 332 product being removed from the cavity 316. By not mixing the fluid 332 and the heat exchanging fluid 340 heat exchanger 300 eliminates the need for an additional separation process.

The layer 321 which forms heat exchanging channel 311 is made of material comprising one of the following composite reinforced plastics, polymers, metals, and/or ceramics. In one example, the heat exchanging channel 311 is fabricated as a single unit or portions via an additive manufacturing process, metal printing process, or forging process. In another example, the heat exchanging channel 311 is formed as a single unit or portions without a welding, extruding, casting, stamping, or forging process.

The heat exchanging channel 311 is shaped without compromising structural integrity or reducing thermal insulating capability. Additionally, cavity 316 is formed by shaping the heat exchanging channel 311. Importantly, the novel heat exchanger does not require a separate distinct structure for storing liquid because the layer 321 of heat exchanging channel 311 simultaneously forms cavity 316 while providing the overall shape for the heat exchanger 300.

Figure 6:
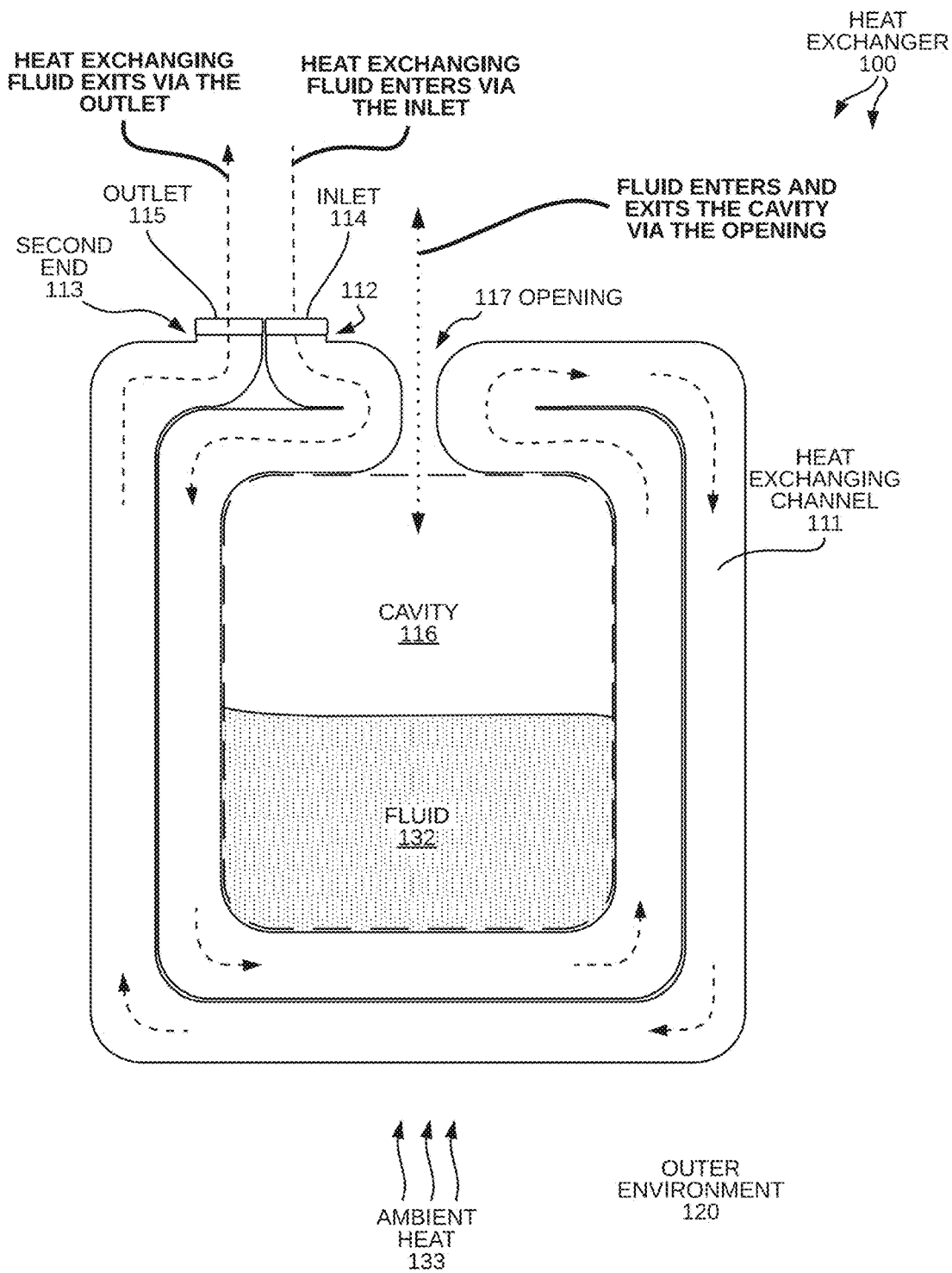
FIG. 6 is a diagram of a view of an exemplary cross section of the heat exchanger 100 showing more curvature.

FIG. 6 is a diagram of a view of an exemplary cross section of the heat exchanger 100 showing more curvature.

Figure 7:
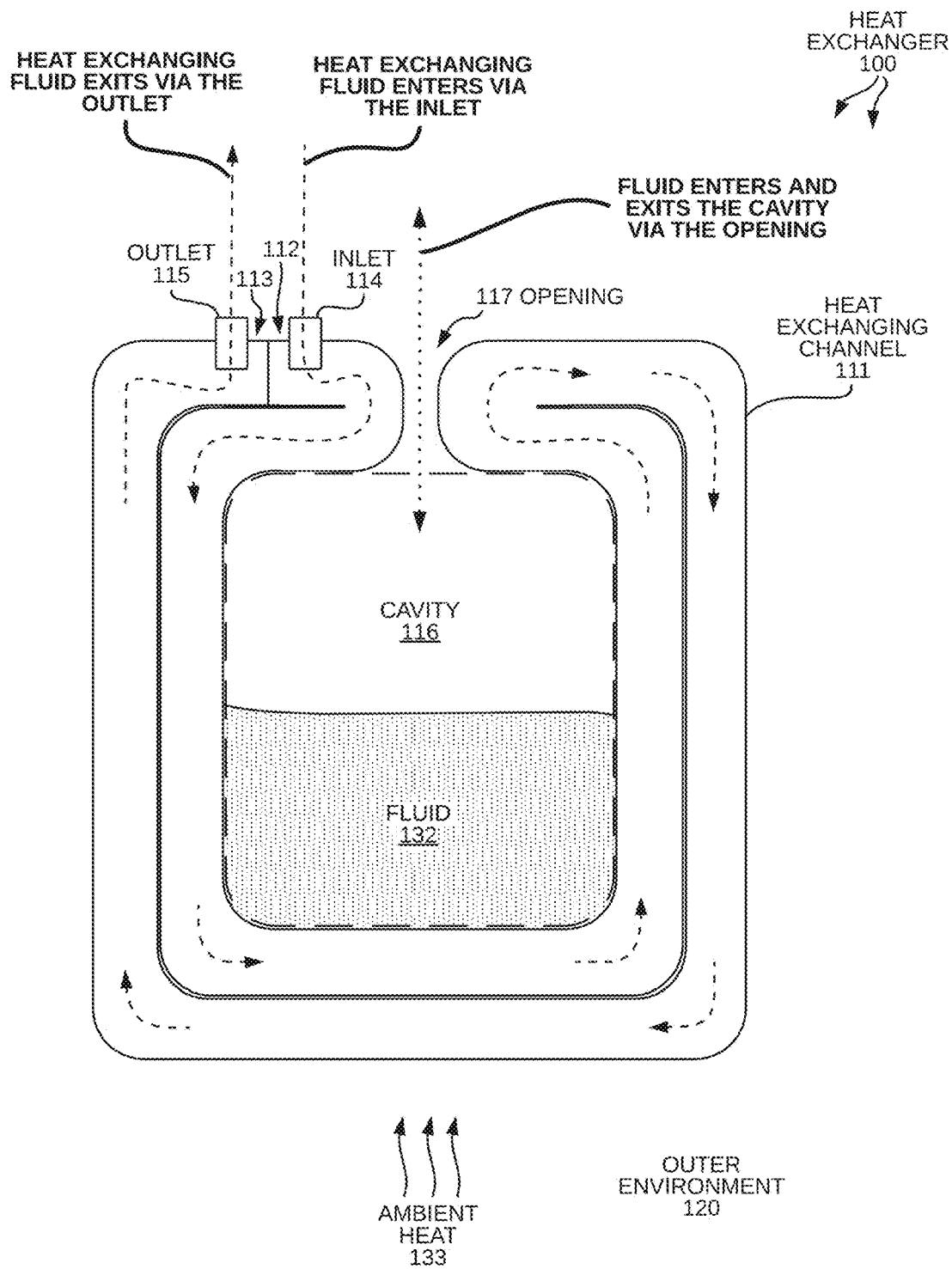
FIG. 7 is a diagram of a view of an exemplary cross section of heat exchanger 100 with the first end 112 connected to the second end 113.

FIG. 7 is a diagram of a view of an exemplary cross section of heat exchanger 100 with the first end 112 connected to the second end 113.

Figure 8:
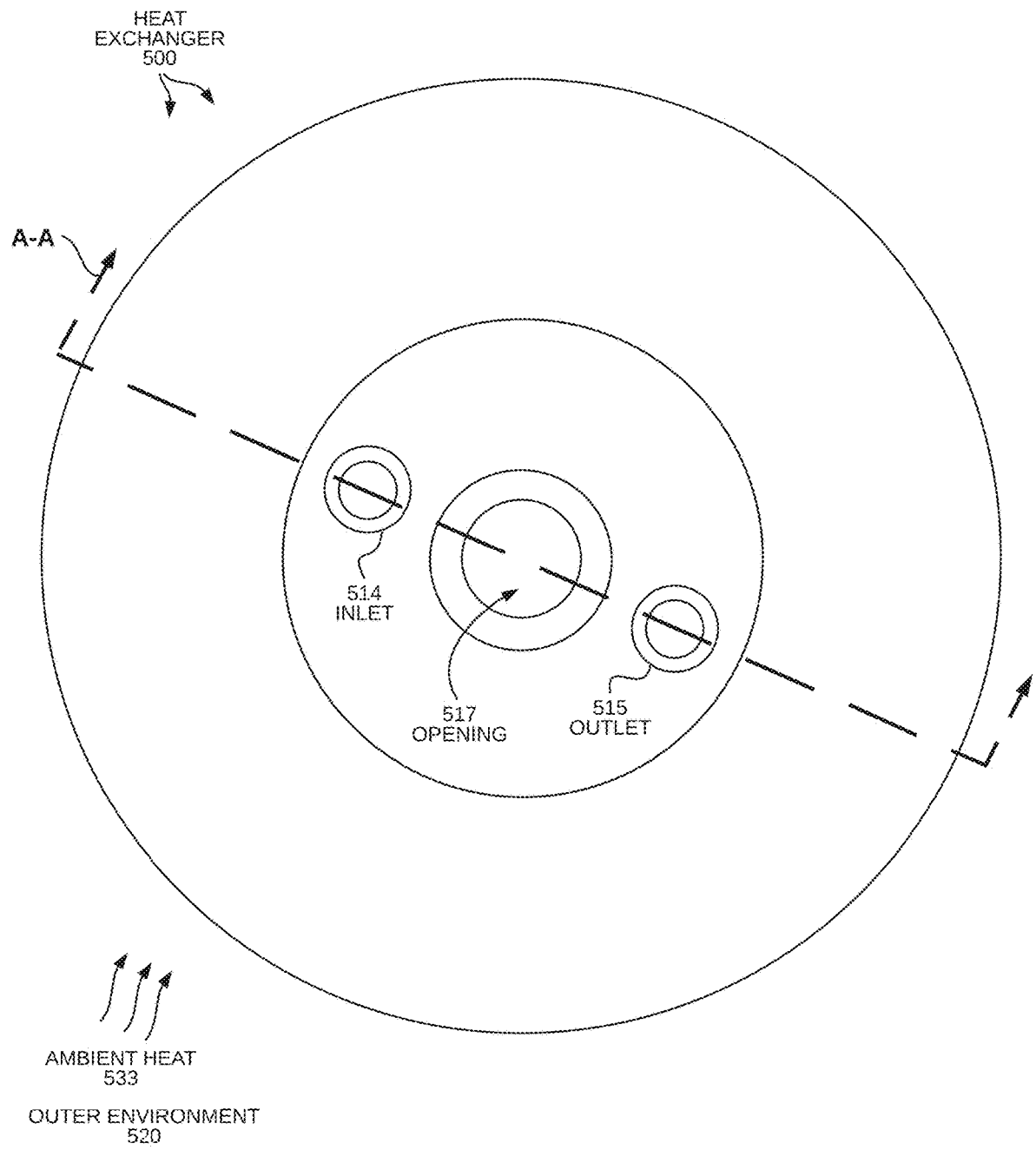
FIG. 8 is a diagram of a top-down view of a heat exchanger 500 in accordance with another embodiment.

FIG. 8 is a diagram of a top-down view of a heat exchanger 500 in accordance with another embodiment. In this embodiment, heat exchanger 500 has a shape substantially similar to a cylinder with curved corners. Accordingly, from a top-down perspective, the heat exchanger 500 has a circular shape. FIG. 8 illustrates an exemplary cross section (A-A) of heat exchanger 500. In this example, the cross section is shaped similar to a rectangle with curved corners (see FIG. 9). Heat exchanger 500 will be further described in the detailed description of FIGS. 9-14 below.

Figure 9:
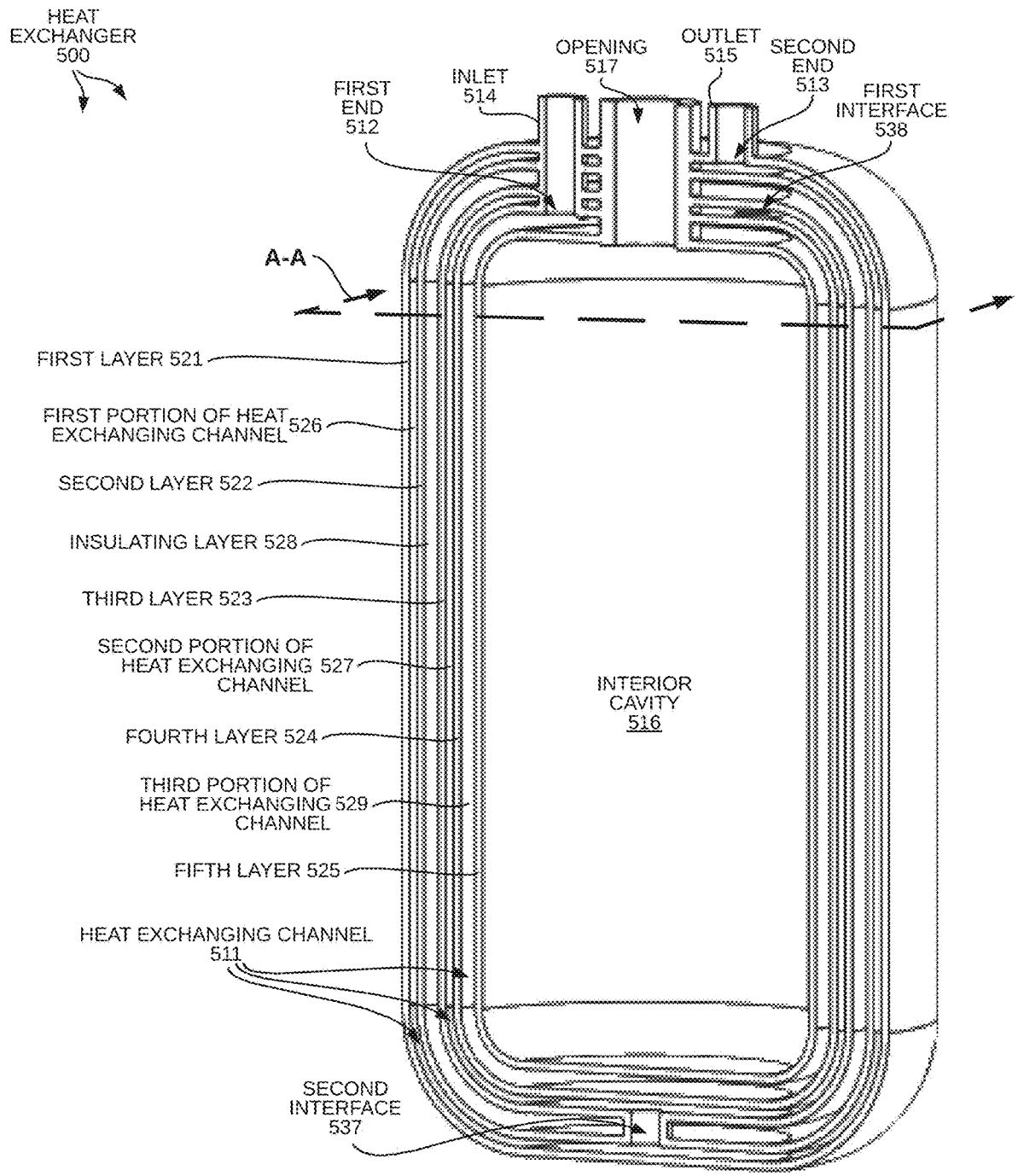
FIG. 9 is a diagram of a perspective view of an exemplary cross section of heat exchanger 500.

FIG. 9 is a diagram of a perspective view of an exemplary cross section of heat exchanger 500. For example, the cross section view is taken at cross-section indicator A-A as shown in FIG. 8.

Heat exchanger 500 comprises a heat exchanging channel 511, an inlet 514, an outlet 515, an interior cavity 516, and an opening 517. The heat exchanging channel 511 extends from a first end 512 to a second end 513. The heat exchanging channel 511 surrounds the cavity 516. The opening 517 provides access to the cavity 516. For example, cryogenic fluid 532 (e.g., liquified hydrogen) is added to the heat exchanger 500 via the opening 517 and stored in the cavity 516. In another example, fluid 532 is removed from the cavity 516 of heat exchanger 500 via the opening 517. The inlet 514 is coupled to the first end 512 of the heat exchanging channel 511 and the outlet 515 is coupled to the second end 513 of the heat exchanging channel 511. During an exemplary operation, heat exchanging fluid 540 flows through the heat exchanging channel 511 input via the inlet 514 and output via the outlet 515.

The heat exchanging channel 511 comprises a plurality of stacked layers 521, 522, 523, 524, and 525 and at least one insulating layer 528. A first layer 521 is disposed along an outermost exterior of the heat exchanger 500. A second layer 522 is disposed adjacent to the first layer 521. The first layer 521 and the second layer 522 form a first portion 526 of heat exchanging channel 511. A third layer 523 is disposed adjacent to a fourth layer 524. The third layer 523 and the fourth layer 524 form a second portion 527 of heat exchanging channel 511. A fifth layer 525 is disposed adjacent to the fourth layer 524. The fourth layer 524 and the fifth layer 525 form a third portion 529 of heat exchanging channel 511.

An insulating layer 528 is disposed between the second layer 522 and the third layer 523. The insulating layer 528 employs any suitable insulating topology to insulate portions of the heat exchanging channel 511 and may include material. For example, materials such as aerogels, rigid foam (e.g., polyisocyanurate, polyurethane), and/or cellular glass can be used to insulate portions of the heat exchanging channel 511. Insulating layer 528 reduces the amount of thermal interaction between the fluid 532 contained in the cavity 516 and outer environment 520. In other words, insulating layer 528 assists in maintaining colder storage temperatures of the interior cavity 516.

There is no interface provided between the insulating layer 528 and the heat exchanging channel 511. No heat exchanging fluid is flowable through the insulating layer 528. No access is provided between the insulating layer 528 and the interior cavity 516. No access is provided between the inlet 514 and the insulating layer 528. No access is provided between the outlet 515 and the insulating layer 528. No access is provided between the opening 517 and the insulating layer 528.

In another embodiment, the heat exchanging channel 511 does not include any insulating layer. In yet another embodiment, heat exchanger 500 includes at least two insulating layers in between various portions of the heat exchanger channel 511.

Each of the first portion 526, second portion 527, and third portion 529 is connected and coupled together such that fluid flows freely throughout the heat exchanging channel 511. A first interface 538 extends through the fourth layer 524. The first interface 538 provides a flow path between the second and third portions 527 and 529 of the heat exchanging channel 511. A second interface 537 extends through the insulating layer 528. The second interface 537 provides a flow path between the first and second portions 526 and 527 of the heat exchanging channel 511. In another embodiment, there are more than two interfaces such that each interface provides a passageway between portions of the heat exchanging channel 511. In other embodiments, the heat exchanging channel 511 is a non-stacked configuration and extends through a single layer.

In accordance with at least one novel aspect, the heat exchanging channel 511 is isolated from the cavity 516 such that fluid in the cavity 516 and heat exchanging fluid in the heat exchanging channel 511 thermally interact but do not contact each other. No access is provided between the heat exchanging channel 511 and the cavity 516. For example, cryogenic fluid in the cavity 516 does not contact heat exchanging fluid in the heat exchanging channel 511. In another embodiment, heat exchanger 500 includes a channel that is disposed between portions of the heat exchanging channel 511 which may be used to add or remove fluid from the cavity 516 without contacting any heat exchanging fluid.

Figure 10:
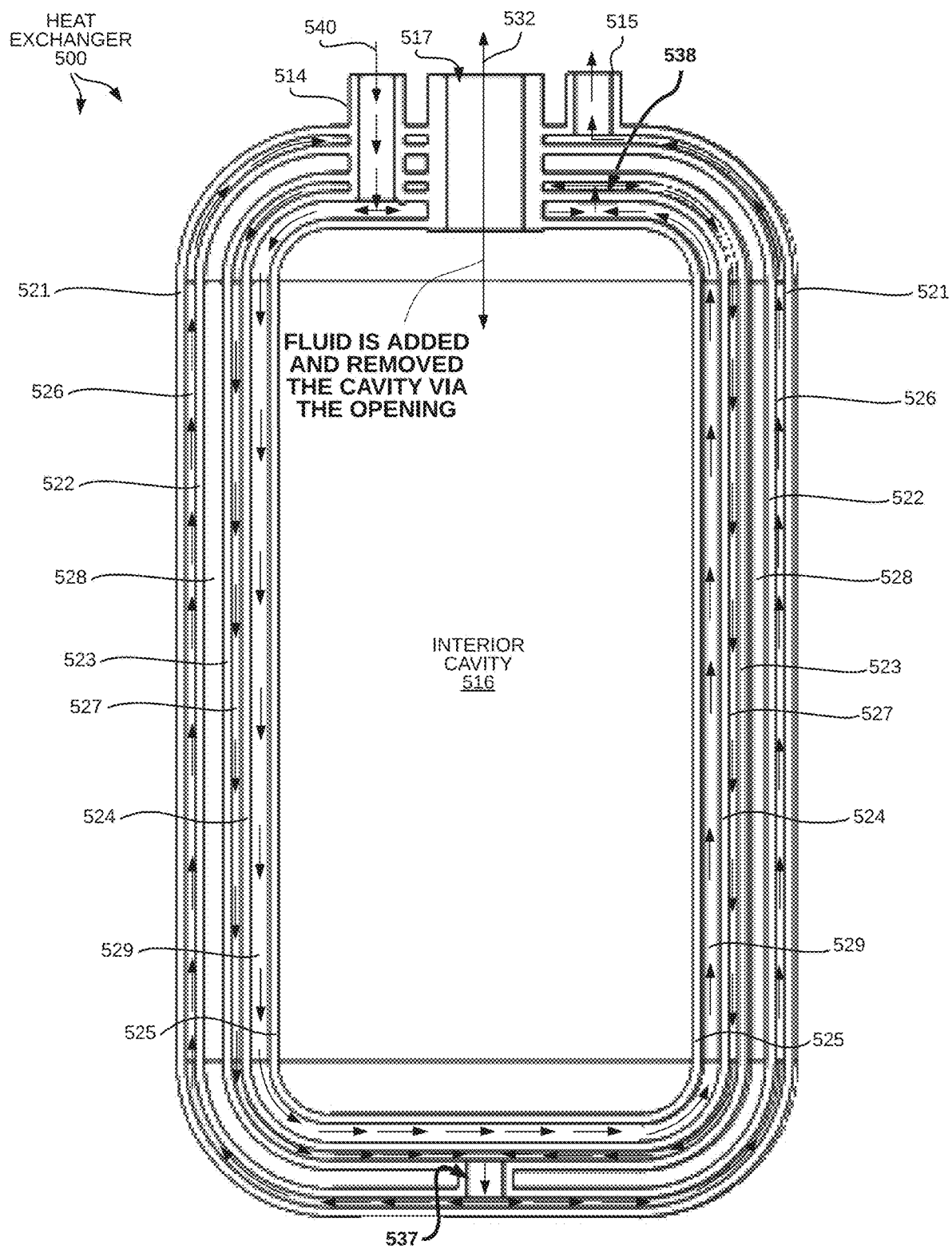
FIG. 10 is a diagram of a cross sectional view of the heat exchanger 500 showing how heat exchanging fluid 540 flows through the heat exchanging channel 511.

FIG. 10 is a diagram of a cross sectional view of the heat exchanger 500 showing how heat exchanging fluid 540 flows through the heat exchanging channel 511. In operation, a heat exchanging fluid 540 flows into the inlet 514. The heat exchanging fluid 540 flows into the first end 512 of the heat exchanging channel 511 and flows through the third portion 529 of the heat exchanging channel 511. The heat exchanging fluid 540 flows from the third portion 529 of the heat exchanging channel 511 through the first interface 538 and through the second portion 527 of the heat exchanging channel 511. The heat exchanging fluid 540 flows from the second portion 527 of the heat exchanging channel 511 through the second interface 537 and through the first portion 526 of the heat exchanging channel 511. The heat exchanging fluid 540 flows from the first portion of the heat exchanging channel 511 and out of the second end 513 of the heat exchanging channel 511. The heat exchanging fluid 540 flows out of the outlet 515.

During an exemplary operation, heat exchanging fluid 540 enters the first end 512 of the heat exchanging channel 511 at a temperature less than or equal to the temperature of the heat exchanging channel 511. The heat exchanging fluid 540 absorbs heat while flowing through the heat exchanging channel 511. Accordingly, heat exchanging fluid 540 exits via the second end 513 at a temperature greater than or equal to the temperature when entering the first end 512. For example, an amount of heat is transferred from fluid 532 contained in the interior cavity 516 through various layers 521, 522, 523, 528, 524, 525, as the heat exchanging fluid 540 flows through the heat exchanging channel 511. Furthermore, at least some of the heat exchanging fluid 540 flowing through the heat exchanging channel 511 thermally interacts with ambient heat 533 emitted from the outer environment 520 thereby reducing the amount of heat that leaks" into the interior cavity 516.

Heat exchanging channel 511 can be configured to receive fluids 532 and 540 based on storage needs. For example, increasing the length of the heat exchanging channel 511 may increase the amount of time it takes heat exchanging fluid 540 to travel from the first end 512 to the second end 513 without increasing the volume of cavity 516. In another example, heat exchanging channel 511 decreasing may decrease the surface area of cavity 516.

The heat exchanging fluid 540 assists in maintaining the temperature of the interior cavity 516. This allows for control of the state of matter of the fluid 532 that is stored within the interior cavity 516. In one example, the fluid 532 stored within the interior cavity 516 is liquid hydrogen ($H_2$). In this example, the heat exchanging fluid 540 is supplied into heat exchanger 500 is a refrigerant (e.g., Helium (He), Hydrogen ($H_2$), Neon (Ne), Nitrogen ($N_2$)).

Figure 11:
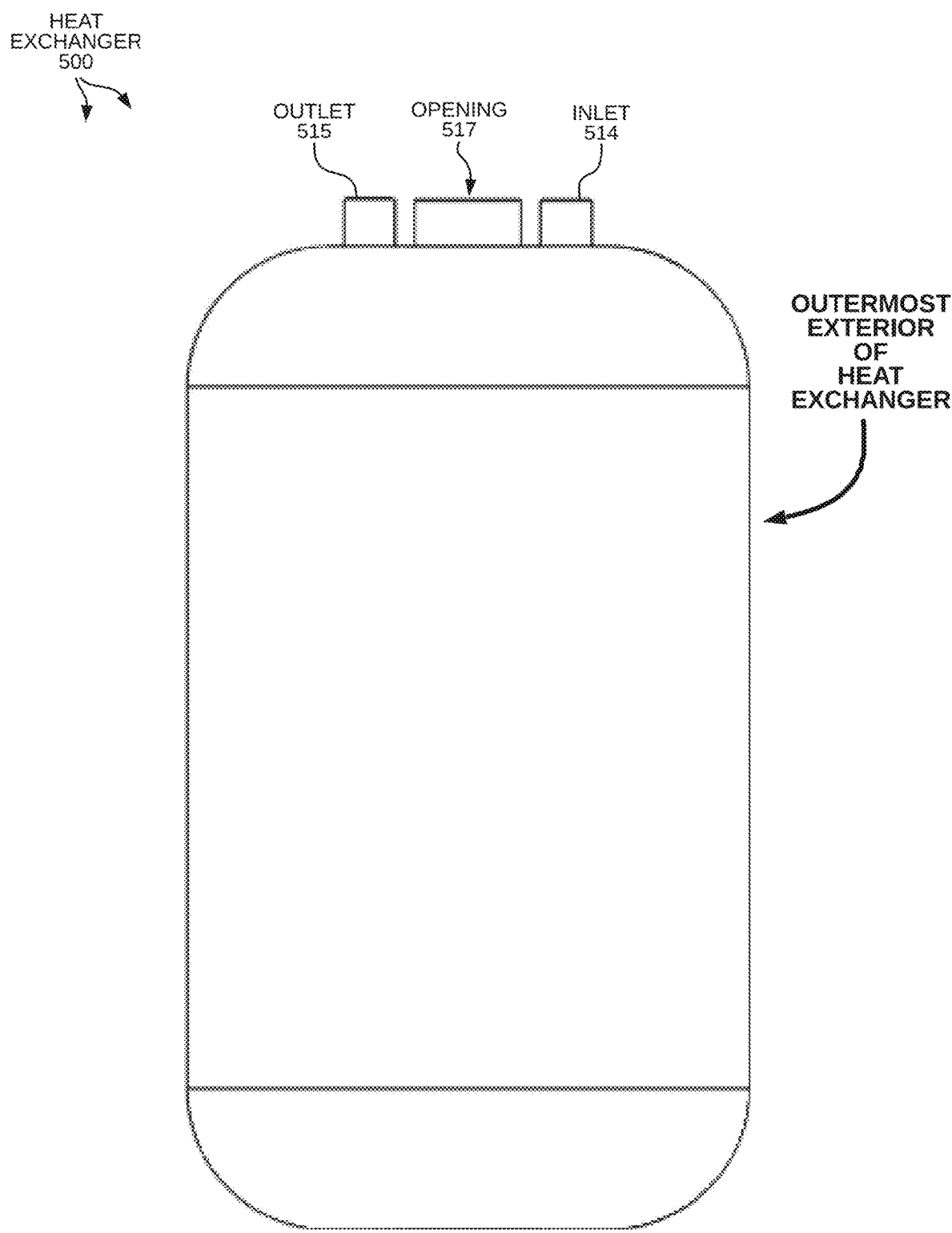
FIG. 11 is a diagram of a back view of heat exchanger 500.

FIG. 11 is a diagram of a back view of heat exchanger 500. In one embodiment, the first layer 521 is disposed along the outermost exterior of heat exchanger 500. In another embodiment, the first layer 521 and the second layer 522 create the first portion 526 of the heat exchanging channel 511 and the first layer 521 comprises a portion of the outermost exterior of heat exchanger 500.

Figure 12:
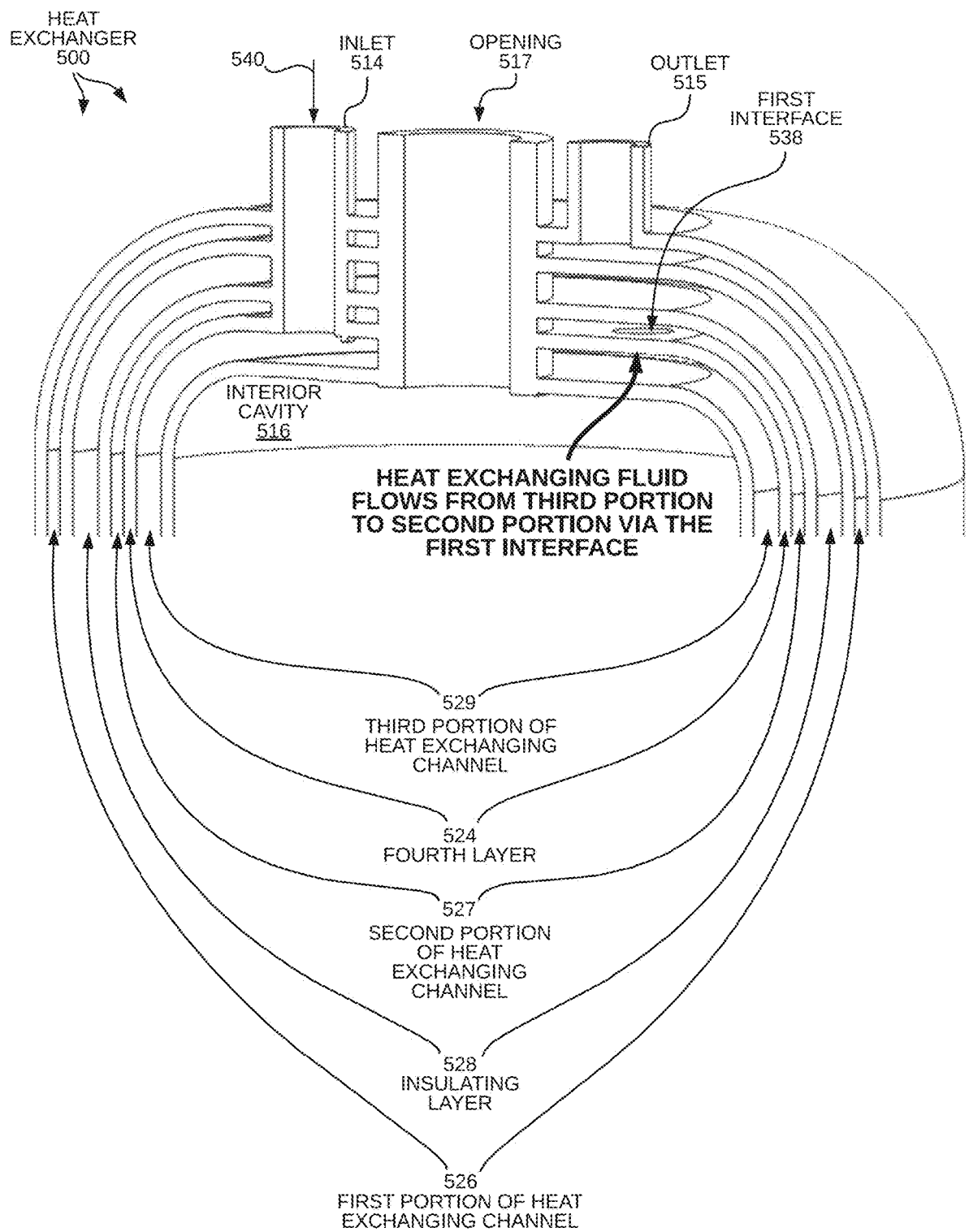
FIG. 12 is a diagram of a cross sectional exploded perspective view of heat exchanger 500.

FIG. 12 is a diagram of a cross sectional exploded perspective view of heat exchanger 500. FIG. 12 shows the third portion 529 of heat exchanging channel 511 connected to the second portion 527 of the exchanging channel 511 via the first interface 538. During operation, heat exchanging fluid 540 flows from the third portion 529 through the first interface 538 to the second portion 527.

In another embodiment, at least two interfaces are each disposed adjacent to the third portion 529 and second portion 527 of the heat exchanging channel 511.

Figure 13:
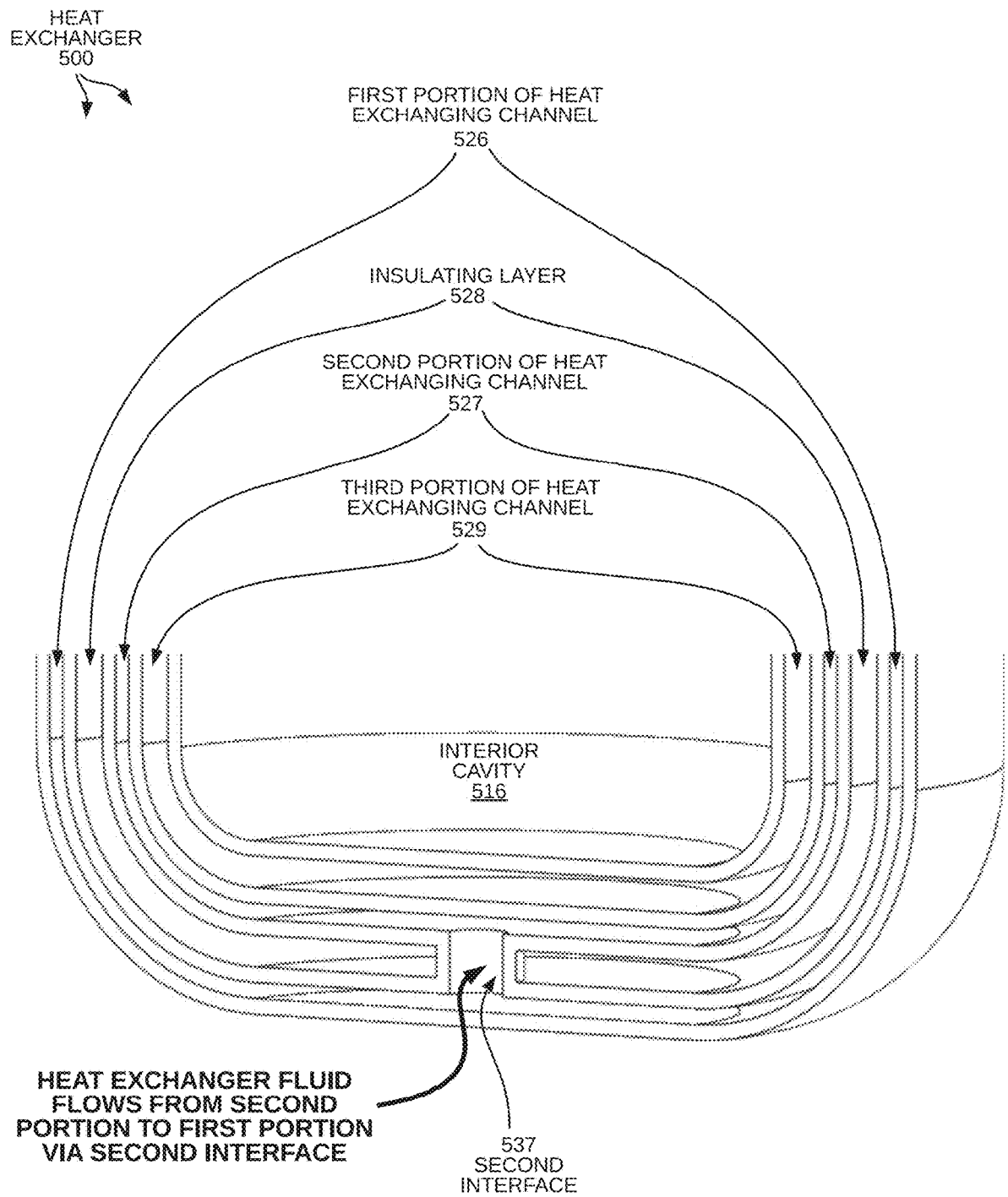
FIG. 13 is a diagram of a cross sectional exploded perspective view of heat exchanger 500.

FIG. 13 is a diagram of a cross sectional exploded perspective view of heat exchanger 500. FIG. 13 shows the second portion 527 of heat exchanging channel 511 connected to the first portion 526 of the exchanging channel 511 via the second interface 537. During operation, heat exchanging fluid 540 flows from the second portion 527 through the second interface 537 to the first portion 526. In another embodiment, at least two interfaces are each disposed adjacent to the second portion 527 and first portion 526 of the heat exchanging channel 511.

Figure 14:
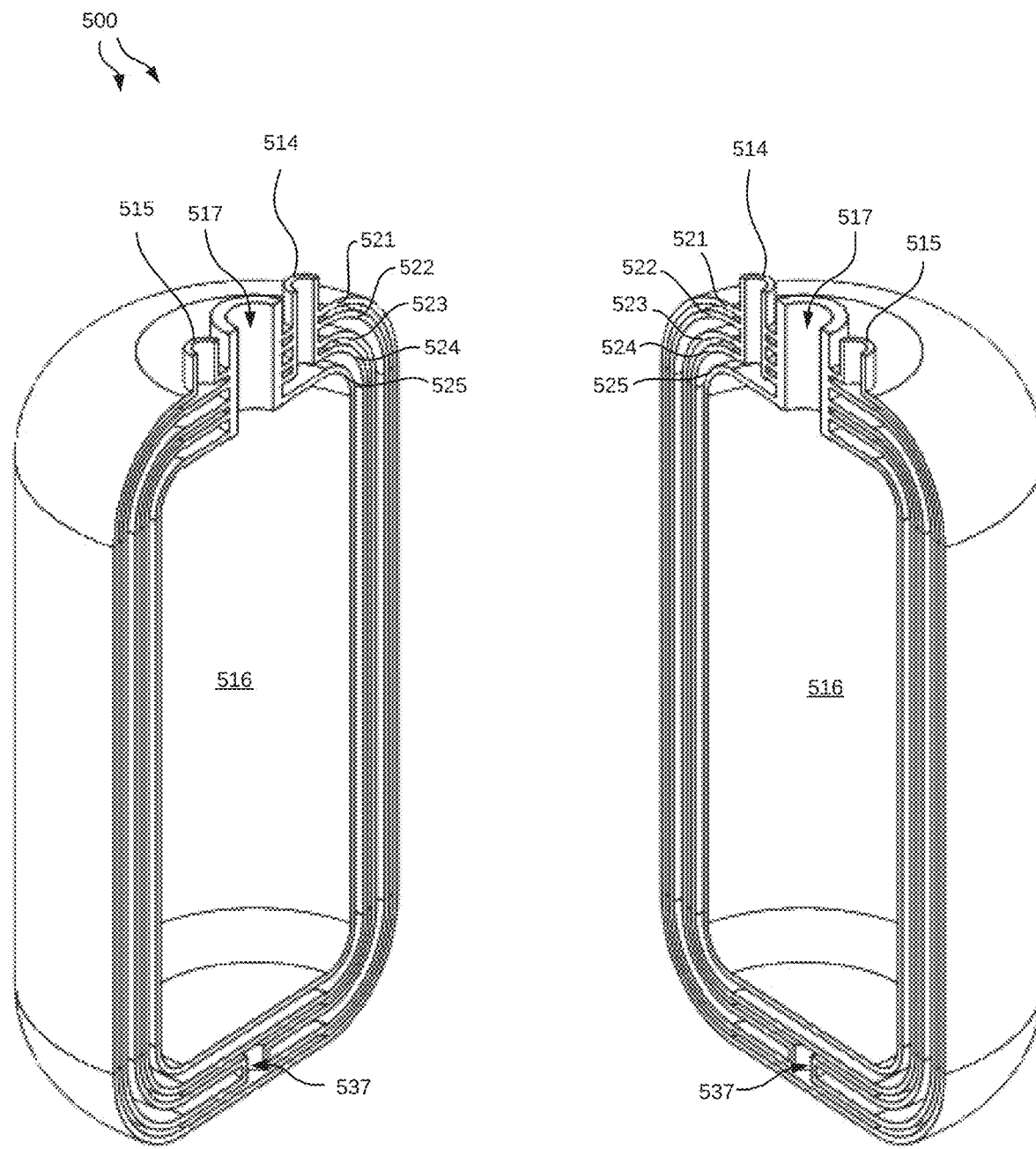
FIG. 14 is a diagram of cross sectional perspective views of heat exchanger 500.

FIG. 14 is a diagram of cross sectional perspective views of heat exchanger 500. In one embodiment, heat exchanger 500 is formed by stacking layers 525, 524, 523, 522, and 521 respectively. In another example, heat exchanger 500 is formed by welding two halves. In yet another example, heat exchanger 500 is a single layer that is shaped, forming the heat exchanger channel 511, cavity 516.

Figure 15:
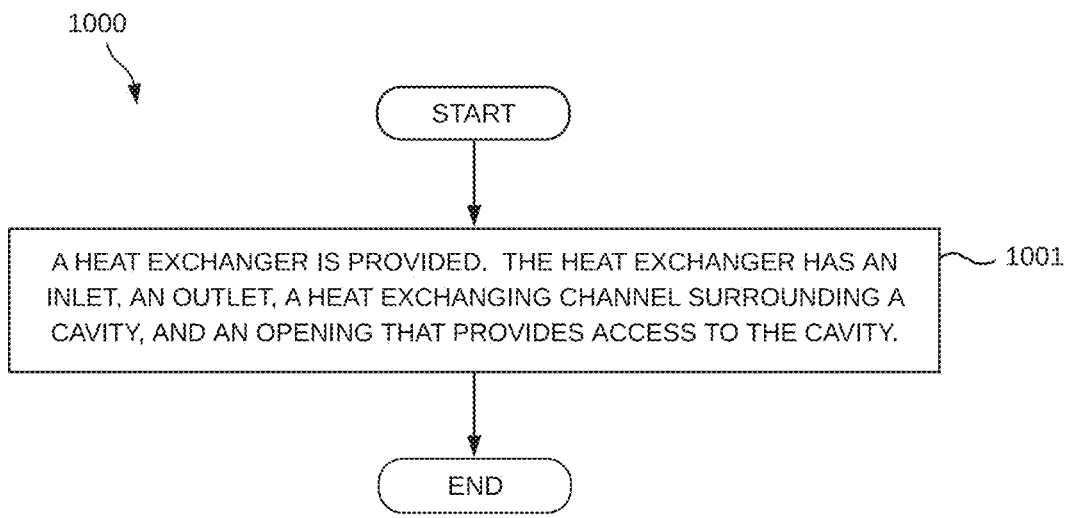
FIG. 15 is a flowchart of a method 1000 in accordance with one novel aspect.

FIG. 15 is a flowchart of a method 1000 in accordance with one novel aspect. In a first step (step 1001), a heat exchanger is provided. The heat exchanger has an inlet, an outlet, a heat exchanging channel surrounding a cavity, and an opening that provides access to the cavity.

Figure 16:
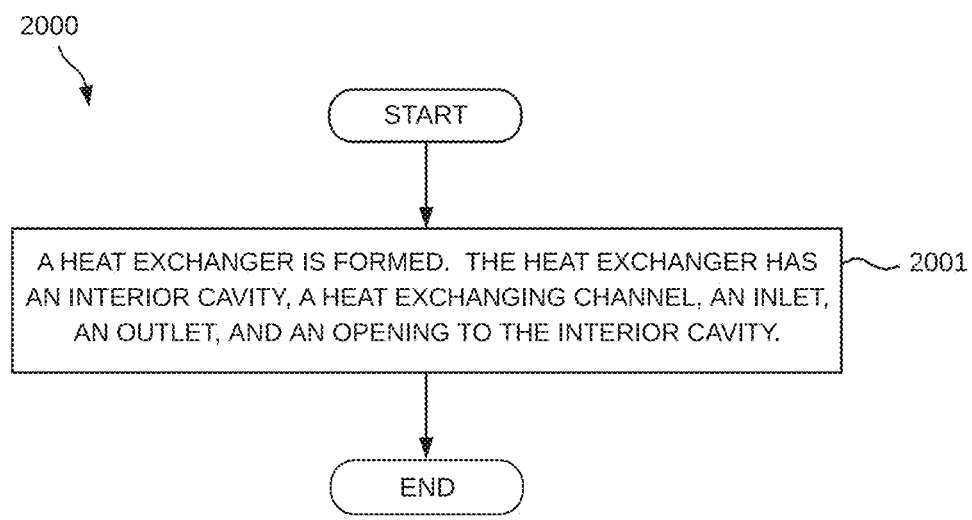
FIG. 16 is a flowchart of a method 2000 in accordance with one novel aspect.

FIG. 16 is a flowchart of a method 2000 in accordance with one novel aspect. In a first step (step 2001), a heat exchanger is formed. The heat exchanger has an interior cavity, a heat exchanging channel, an inlet, an outlet, and an opening to the interior cavity.

Although certain specific embodiments are described above for instructional purposes, the teachings of this patent document have general applicability and are not limited to the specific embodiments described above.

For example, the inlet, outlet, and opening of each of the heat exchangers 100, 200, 300, 400, and 500 may be partially internal and partially external, fully internal or fully external.

Although not shown, the heat exchanger may be closed from the outer environment. For example, during exemplary operation, each of the inlet 514, outlet 515, and opening 517 of heat exchanger 500 is connected to an exterior source that prevents any fluids from directly contacting the outer environment 520 while in the heat exchanger 500. In another example, at least one of the inlet 514, outlet 515, and/or opening 517 includes a cover that prevents fluids from entering or exiting the heat exchanger. In yet another example, the heat exchanger may include at least one valve that may be electronically controlled. For example, a valve coupled to inlet 514 of heat exchanger 500 would assist in the control of flow rate of fluid 540 entering heat exchanging channel 511.

Interfaces between portions of the heat exchanging channel 511 may be disposed in different locations depending on the number of layers or a desired amount of time a fluid is to travel through a portion of the heat exchanging channel. For example, FIG. 9 shows the first interface 538 disposed in the top right of the fourth layer 524. In another example, the first interface 538 is disposed in a different location in the fourth layer 524. Additionally, FIG. 9 shows the second interface 537 disposed in the bottom middle of the second and third layers 522 and 523 but can be disposed in a different location.

In other embodiments, the heat exchanger includes sensors for measuring fluid characteristics such as temperature, pressure, flow rate, and/or composition. For example, in the embodiment of heat exchanger 500 that includes sensors, a fluid characteristic sensor may be placed in the first end 512, second end 513, and/or the cavity 516.

Accordingly, various modifications, adaptations, and combinations of various features of the described embodiments can be practiced without departing from the scope of the invention as set forth in the claims.

What is claimed is:

1. An apparatus comprising:
   a cavity for holding a stored fluid;
   an opening that provides access to the cavity;
   an inlet to a heat exchanging channel and an outlet from the heat exchanging channel;
   the heat exchanging channel surrounding the cavity, the heat exchanging channel comprising a first layer bounding the cavity and a second layer outside the first layer, the first layer in fluid communication with the second layer to allow a flow of heat transfer fluid from the inlet to the outlet such that the heat transfer fluid Said controls a temperature of the stored fluid in the cavity; and the cavity comprising a stored fluid exit connected to a passage extending between the first layer and the second layer, the passage allowing a flow of the stored fluid from the stored fluid exit of the cavity to a stored fluid outlet controlling flow of the stored fluid to an exterior away from the cavity.

2. The apparatus of claim 1, wherein the heat exchanging channel forms the cavity, wherein the inlet is coupled to one end of the heat exchanging channel and the outlet is coupled to another end of the heat exchanging channel.

3. The apparatus of claim 1, wherein the heat exchanging channel is isolated from the cavity such that fluid in the cavity and heat exchanging fluid in the heat exchanging channel do not contact each other.

4. The apparatus of claim 1, wherein no access is provided between the heat exchanging channel and the cavity.

5. The apparatus of claim 1, wherein an insulating layer is disposed along the heat exchanging channel.

6. The apparatus of claim 1, wherein the heat exchanging channel has stacked layers.

7. The apparatus of claim 1, further comprising:
a fluid channel, wherein one end of the fluid channel is coupled to the cavity via a fluid inlet, and wherein the other end of the fluid channel is coupled to a fluid outlet.

8. The apparatus of claim 7, wherein a portion of an outer surface of the fluid channel contacts a fluid.

9. The apparatus of claim 1 further comprising an insulative layer between the first layer and the second layer.

10. The apparatus of claim 1 further comprising an insulative layer between the passage and the first layer.

11. The apparatus of claim 1 wherein the heat exchanging channel extends from a top of the cavity around the cavity and returns to the top of the cavity to allow flow from the inlet around the cavity to the outlet.

12. The apparatus of claim 1 wherein the passage extends from the top of the cavity around the cavity and returns to the top of the cavity to allow flow from the stored fluid exit to the stored fluid outlet.

13. The apparatus of claim 1 wherein the heat exchanging channel surrounding the cavity comprises the heat exchanging channel avoiding extending into the cavity.

* * * * *

UNITED STATES PATENT AND TRADEMARK OFFICE
CERTIFICATE OF CORRECTION

| | | |
|---|---|---|
| PATENT NO. | : 12,480,714 B2 | Page 1 of 1 |
| APPLICATION NO. | : 17/659504 | |
| DATED | : November 25, 2025 | |
| INVENTOR(S) | : Elijah Shoemake | |

It is certified that error appears in the above-identified patent and that said Letters Patent is hereby corrected as shown below:

In the Claims

Column 12, Line 66: Claim 1, Delete "SAID"

Signed and Sealed this
Thirtieth Day of December, 2025

John A. Squires
*Director of the United States Patent and Trademark Office*